(12) United States Patent
Buck

(10) Patent No.: US 7,946,073 B1
(45) Date of Patent: May 24, 2011

(54) RETICLE AIMING DEVICE

(76) Inventor: Robert R. Buck, St. Paul, MN (US)

(*) Notice: Subject to any disclaimer, the term of this patent is extended or adjusted under 35 U.S.C. 154(b) by 678 days.

(21) Appl. No.: 12/017,947

(22) Filed: Jan. 22, 2008

Related U.S. Application Data

(60) Provisional application No. 60/881,666, filed on Jan. 22, 2007.

(51) Int. Cl.
*F41G 1/38* (2006.01)
(52) U.S. Cl. ............................................. 42/130; 42/131
(58) Field of Classification Search .................... 42/130, 42/131

See application file for complete search history.

(56) References Cited

U.S. PATENT DOCUMENTS

| | | | | |
|---|---|---|---|---|
| 6,032,374 | A * | 3/2000 | Sammut | 42/122 |
| 6,357,158 | B1 * | 3/2002 | Smith, III | 42/122 |
| 6,453,595 | B1 * | 9/2002 | Sammut | 42/130 |
| 7,325,353 | B2 * | 2/2008 | Cole et al. | 42/119 |
| 7,603,804 | B2 * | 10/2009 | Zaderey et al. | 42/122 |
| 7,685,760 | B1 * | 3/2010 | Neumaster | 42/129 |
| 2005/0229468 | A1 * | 10/2005 | Zaderey et al. | 42/122 |
| 2005/0268521 | A1 * | 12/2005 | Cox et al. | 42/130 |
| 2006/0260171 | A1 * | 11/2006 | Cole et al. | 42/122 |
| 2007/0137088 | A1 * | 6/2007 | Peters et al. | 42/111 |

* cited by examiner

*Primary Examiner* — Bret Hayes
(74) *Attorney, Agent, or Firm* — Dorsey & Whitney LLP; Adam M. Bramwell, Esq.

(57) ABSTRACT

In one embodiment, the reticle for a projectile weapon aiming system comprises a primary horizontal sight line, a primary vertical sight line which intersects the primary horizontal sight line to define a primary aiming point, a windage grid, a ballistics grid, and a range finder grid.

15 Claims, 5 Drawing Sheets

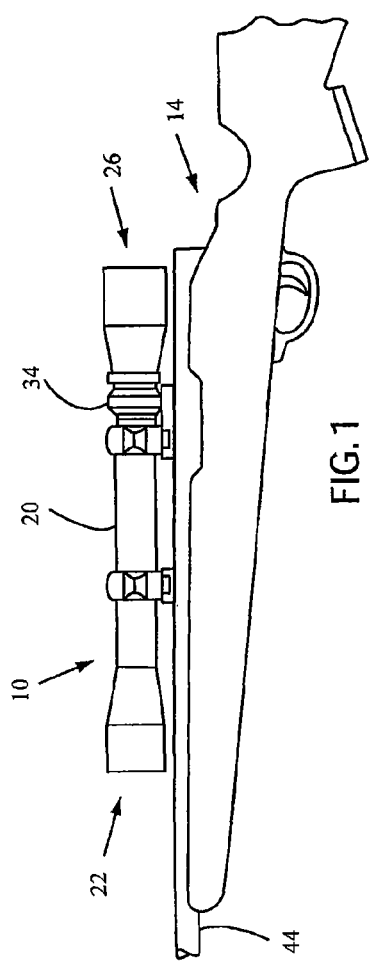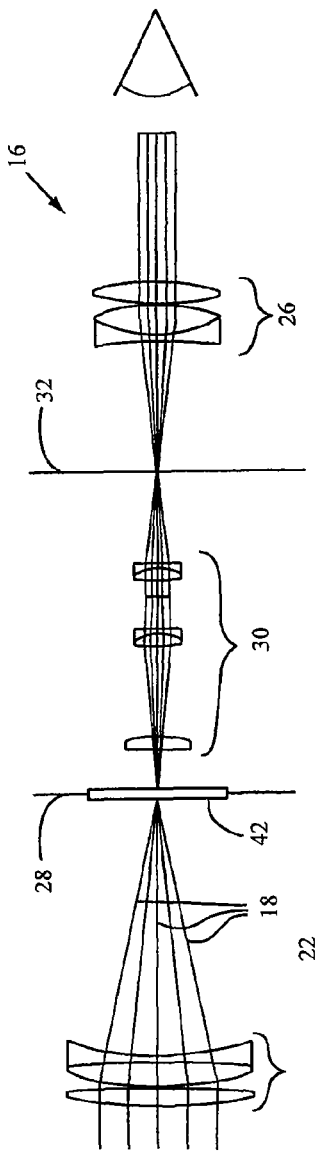

RANGE FINDER 20"

600 YD SIGHT PICTURE

RANGE FINDER 20"

1000 YD SIGHT PICTURE

RANGE FINDER 48 CM

600 METER SIGHT PICTURE

RETICLE AIMING DEVICE

RELATED APPLICATIONS

This application claims the benefit of U.S. Provisional Application Ser. No. 60/881,666 filed on Jan. 22, 2007, the entire disclosure of which is incorporated herein by reference.

FIELD OF THE INVENTION

The present disclosure relates to optical sighting systems for use on projectile delivering systems. More particularly, the present disclosure relates to reticle configurations for projectile weapon aiming systems.

BACKGROUND

Telescope sights or riflescopes are used by shooters to enable accurate aiming of firearms such as rifles, pistols, shotguns and the like. These optical sights are typically mounted in an elongated tubular barrel or housing carrying conventional ocular and objective lens systems. An erector-lens system is provided between the ocular and objective systems to provide an erect target image for viewing by the shooter.

A conventional riflescope includes a reticle, typically of cross hair or post form, which is seen by the shooter in silhouette and superimposed over the target image. The position of the firearm is adjusted until the reticle is positioned on a target-image aiming point.

In using the scope to its fullest extent, a user must properly adjust for several external factors. A factor which must be taken into account in long-range shooting is the curved trajectory traversed by a bullet as it falls below the axis of the rifle bore while traveling the distance from the rifle muzzle to the target, i.e., "range." Other common factors include wind condition and ballistic coefficient. Typically, such adjustments are approximated by means of the reticle. Thus, reticles which enable a shooter to quickly and accurately make such field adjustments are particularly advantageous.

BRIEF SUMMARY OF THE INVENTION

An optical sighting system for use on projectile delivering systems is provided. More particularly, reticle configurations for projectile weapon aiming systems is provided.

In one embodiment, a reticle for a projectile weapon aiming system is provided. In one embodiment, the reticle comprises a primary horizontal sight line, a primary vertical sight line which intersects the primary horizontal sight line to define a primary aiming point, a windage grid, a ballistics grid, and a range finder grid.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

FIG. 1 is a side view of an embodiment of a telescopic sight of the present invention mounted upon a rifle.

FIG. 2 is a schematic illustration of the internal components of a telescopic sight of the type shown in FIG. 1.

Figure 3:
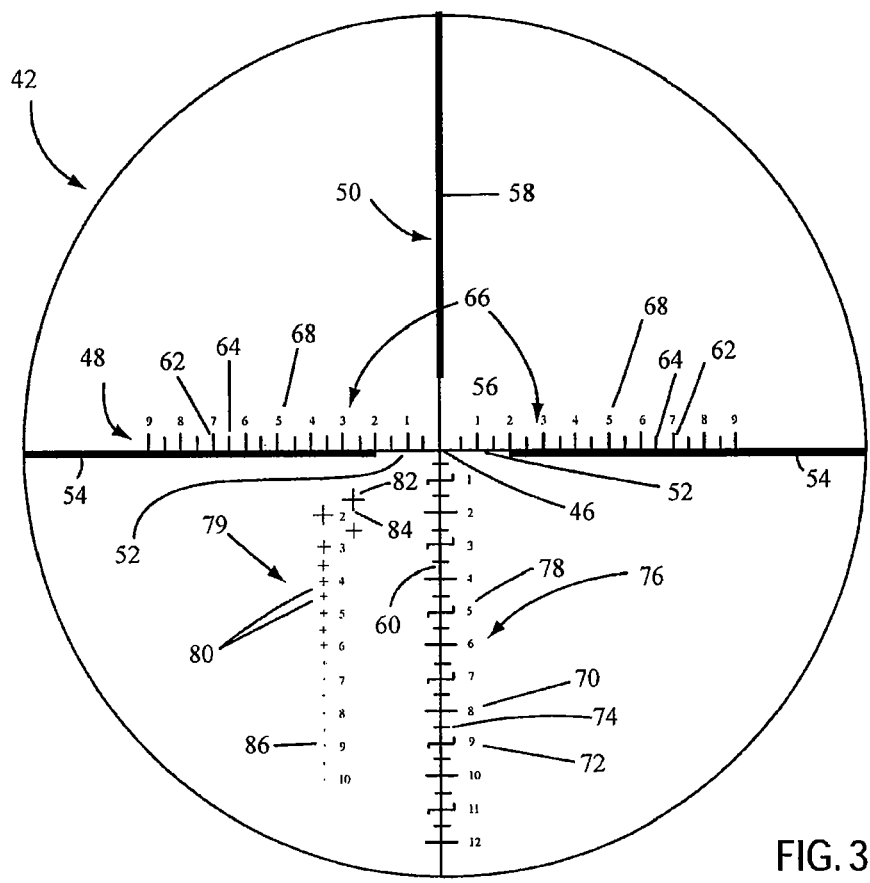
FIG. 3 is a view of a reticle in accordance with one embodiment of the present invention.

Throughout the figures, the same reference numerals and characters, unless otherwise stated, are used to denote like features, elements, components, or portions of the illustrated embodiments. Moreover, while the present invention will now be described in detail with reference to the figures, it is done so in connection with the illustrative embodiments.

DETAILED DESCRIPTION

FIG. 1 is a side elevation view of a standard riflescope 10 mounted to a rifle 14 illustrating an environment of use for reticles according to the present disclosure. In one embodiment, riflescope 10 is slide mounted to rifle 14. FIG. 2 is a schematic diagram showing an arrangement of prior art optical elements 16 of riflescope 10, together with ray trace lines 18 indicating the path of light from an observed object located to the left of the assembly of optical elements 16, as the light travels through the optical system along an optical path.

With reference to FIGS. 1 and 2, riflescope 10 includes a tubular housing 20 that supports at opposite ends an objective or objective lens assembly 22 and an ocular or ocular lens assembly 26 (sometimes referred to as an eyepiece or eyepiece lens assembly). The diameter of tubular housing 20 may range from 30-40 mm, in one embodiment, or from 34-40 mm in another embodiment. In alternative embodiments, other ranges of diameter may be used.

Objective lens 22 focuses the image of an observed object at a first (front) focal plane 28 located medially of objective lens 22 and ocular lens 26. In one embodiment, the objective lens 22 comprises a 50/56 mm objective lens. In alternative embodiments, other sizes of objective lens may be used. In one embodiment, the objective lens 22 may have either or both of anti-reflective coating and added filters. An erector lens assembly 30 interposed between objective lens 22 and ocular lens 26 inverts the image and refocuses it at a second (rear) focal plane 32 between erector lens assembly 30 and ocular lens 26. At least a part of erector lens assembly 30 may be movable in response to rotation of a power selector ring 34 or other power selector mechanism to adjust the optical power of riflescope 10 within a predetermined range of magnification. For example, the optical power of riflescope 10 may range between approximately 4.5× and 25× magnification. In further embodiments, the optical power of riflescope 10 may be fixed or may have a different zoom ratio.

In some embodiments, a reticle 42 may be located in the optical path between objective lens 22 and ocular lens 26. In one embodiment, a reticle 42 may be located between erector lens assembly 30 and objective lens 22, at or adjacent to first focal plane 28. It should be appreciated that the reticles described herein are not limited to use in riflescopes or with rifles, but may also be used in various other types of optical sighting devices, such as for example, cameras, binoculars, telescopes, surveying devices and may also be used to aim one or more of a variety of projectile weapons, such as rifles, pistols, crossbows, artillery, and others.

FIG. 3 illustrates an embodiment of a reticle 42 as viewed through ocular lens 26 of riflescope 10. With reference to FIG. 3, reticle 40 is preferably formed on a substantially flat disc of optical quality material, such as glass or plastic, and includes a primary aiming point 46 defined by the intersection of a primary horizontal sight line 48 and a primary vertical sight line 50 (crosshairs). In some embodiments, primary aiming point 46 may represent the sighted-in bullet impact point at a predetermined distance. For example, in one embodiment illustrated in FIG. 3, primary aiming point 46 may represent the sighted-in bullet impact point at 100 meters.

Referring specifically to FIG. 3, the primary horizontal sight line 48 includes central portions 52 that extend radially from primary aiming point 46. The primary horizontal sight line 48 further includes at least one widened post portion. In the embodiment shown, two widened post portions 54 are provided that extend radially from the corresponding thin central portions 52. In various embodiments the post portions 54 are thicker than central portions 52 to draw a shooter's eye to the thinner central portions 52 and thereby help the shooter to locate primary aiming point 46.

In some embodiments, the primary vertical sight line may include an upper central portion 56 that extends radially upward from the primary aiming point 46 and a vertical post portion 58 that extends radially from the upper central portion 56. As with the horizontal post portions 54, the vertical post portion 58 may be thicker than central portion 56 to draw a shooter's eye to the thinner central portions 56.

In one embodiment, the primary vertical sight line 50 may further include a lower portion 60 extending radially from the primary aiming point 46. The lower portion 60 may have a thickness approximately equal to that of the upper central portion 56.

In some embodiments, the reticle 42 may include right and left primary horizontal aiming marks 62 and right and left secondary horizontal aiming marks 64 disposed on the primary horizontal sight line 54. Collectively, the right and left horizontal aiming marks 62 and 64 may comprise a windage grid 66. The aiming marks 62 and 64 of the windage grid 66 are spaced to provide compensate for wind effect and to lead a moving target.

In one embodiment, secondary marks 64 subdivide the space between primary marks 62 into equal halves. Accordingly, a single secondary mark 64 is disposed equidistant between two adjacent aiming primary marks 62. In some embodiments, the aiming marks 62 and 64 have a thickness that is approximately equivalent to or less than central portion 52. In one embodiment, secondary horizontal aiming marks 64 may have a length less than primary horizontal aiming marks 62 to indicate the measure of a lesser unit value.

In one embodiment, one or more of the primary horizontal aiming marks 62 may be provided with unique symbols. For example, as shown, horizontal aiming marks 62 may be provided with numbers 68 corresponding to the relative horizontal distance from the primary aiming point 46. In one embodiment, each of the horizontal aiming marks 62 may represent 100 cm increments. Additionally, in one embodiment, each of the secondary horizontal aiming marks 64 may represent 50 cm increments. In various embodiments, the horizontal aiming marks may be used to represent different increments. These increments may be English or metric as suitable for the application.

In some embodiments, the lower portion 60 of the primary vertical sight line 50 may include primary vertical aiming marks 70, secondary vertical aiming marks 72, and tertiary vertical aiming marks 74. Collectively, the vertical aiming marks 70, 72, and 74 may comprise a ballistics grid 76. In one embodiment, primary aiming marks 70 may have a length which is greater than that of each of the secondary marks 72 and tertiary marks 74. In a further embodiment, secondary aiming marks 72 may have a length which is greater than that of the tertiary aiming marks 74. In one embodiment, secondary aiming marks 74 may comprise an aiming mark having a right end portion extending upward in a direction substantially parallel to the primary vertical sight line 50 and a left end portion extending downward in a direction substantially parallel to the primary vertical sight line 50. Such variation among the vertical aiming marks which comprise the ballistics grid 76 may allow a user of the reticle 42 to more easily distinguish between vertical aim marks, for example.

In one embodiment, vertical aiming marks 70, 72, and 74 may be provided in the pattern as shown in FIG. 3. That is, in one embodiment, tertiary marks 74 subdivide the space between aiming marks 70 and 72 into equal halves. Accordingly, a single tertiary mark 64 is disposed equidistant between two adjacent primary and secondary aiming marks 70 and 72. In some embodiments, the aiming marks 70, 72, and 74 have a thickness that is approximately equivalent to or less than lower portion 60 of the primary vertical sight line 50.

In some embodiments, each of the vertical aiming marks 70, 72, and 74 may represent a 50 cm increment from the adjacent marks, and accordingly, each of the primary and secondary aiming marks 70 and 72 may represent 100 cm increments relative to the primary aiming point 46. In various embodiments, the vertical aiming marks may be used to represent different increments. These increments may be English or metric as suitable for the application. Additionally, in some embodiments, one or more of the primary and secondary vertical aiming marks 70 and 72 may be provided with unique symbols. For example, as shown, primary and secondary aiming marks 70 and 72 may be provided with numbers 78 corresponding to the relative vertical distance from the primary aiming point 46.

Figure 4:
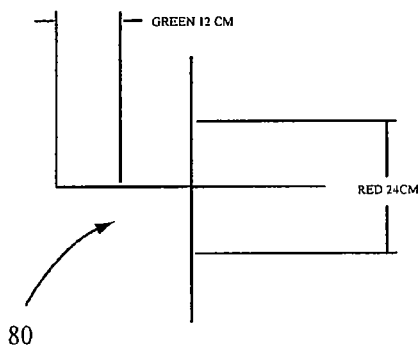
FIG. 4 is an enlarged view of a region of the reticle of FIG. 3.

In some embodiments, provided, at least in part, in the lower left quadrant of the reticle 42 may be a range finder grid 79. Generally, the range finder grid 79 aids a user of the reticle 42 in identifying the range of a target, i.e., the distance of the target from the user of the reticle. Establishing an accurate range may be critical in, for example, compensating for the parabolic drop of a bullet caused by force of gravity as it travels to a target. In one embodiment, the range finder grid 44 may comprise a plurality of crosshairs 80 extending in a direction substantially parallel to the primary vertical sight line 50. In one embodiment, each of the crosshairs 80 of the range finder may define a 48×48 cm reading at a predetermined range. FIG. 4 is an enlarged illustration of a crosshair 80 in accordance with one embodiment. As will be appreciated by those skilled in the art, the range finder grid 79 may be used for estimating a range to a target having features of known or estimable size.

In some embodiments, as previously mentioned, the primary aiming point 46 may represent the sighted-in bullet impact reading at a range of 100 meters. Thus, in one embodiment, the primary aiming point 46 and the immediately surrounding 48×48 cm crosshair region, may comprise the first reading of the range finder grid 79. In one embodiment, the first reading of the range finder grid comprises a 100 meter reading. It is to be appreciated that these measurements are used for illustrative purposes only and are not intended to be limiting.

In some embodiments, moving in a downward direction, the crosshairs 80 of the range finder 79 may correspond to readings which increase in increments of 50 meters. That is, crosshair 82 may correspond to a reading of 150 meters, crosshair 84 may correspond to a reading of 200 meters, and so on. In one embodiment, the range finder 79 comprises crosshairs which correspond to readings of up to 1000 meters. In some embodiments, one or more of the crosshairs 80 may be provided with unique symbols. For example, as shown, one or more of the crosshairs 80 may be provided with numbers 86 corresponding to the range of the reading.

In some embodiments, portions of the crosshairs 80 are provided in one or more colors. For example, in one embodiment, each of the crosshairs 80 may be provided in one or more colors as shown in FIG. 4. That is, in one embodiment, the inner half of crosshairs 80, corresponding to a 24×24 cm region, may be provided in one color and the remaining portion, or outer 24×24 cm region, may be provided in an alternative color. In one embodiment, the crosshairs may be provided in any of red, green, and/or orange. In a further embodiment, any or all of the colors may be provided in weapons grade fluorescent.

In further embodiments, the markings which comprise either or both of the windage grid 66 and ballistics grid 76 may be provided in color. For example, in one embodiment, the marking which comprise the windage grid 66 and ballistics grid 76 are provided in the color red. Alternatively, the windage grid 66 and ballistics grid 76 may be provided in any color. In one embodiment, any or all of the colors may be provided in weapons grade fluorescent.

Figure 5:
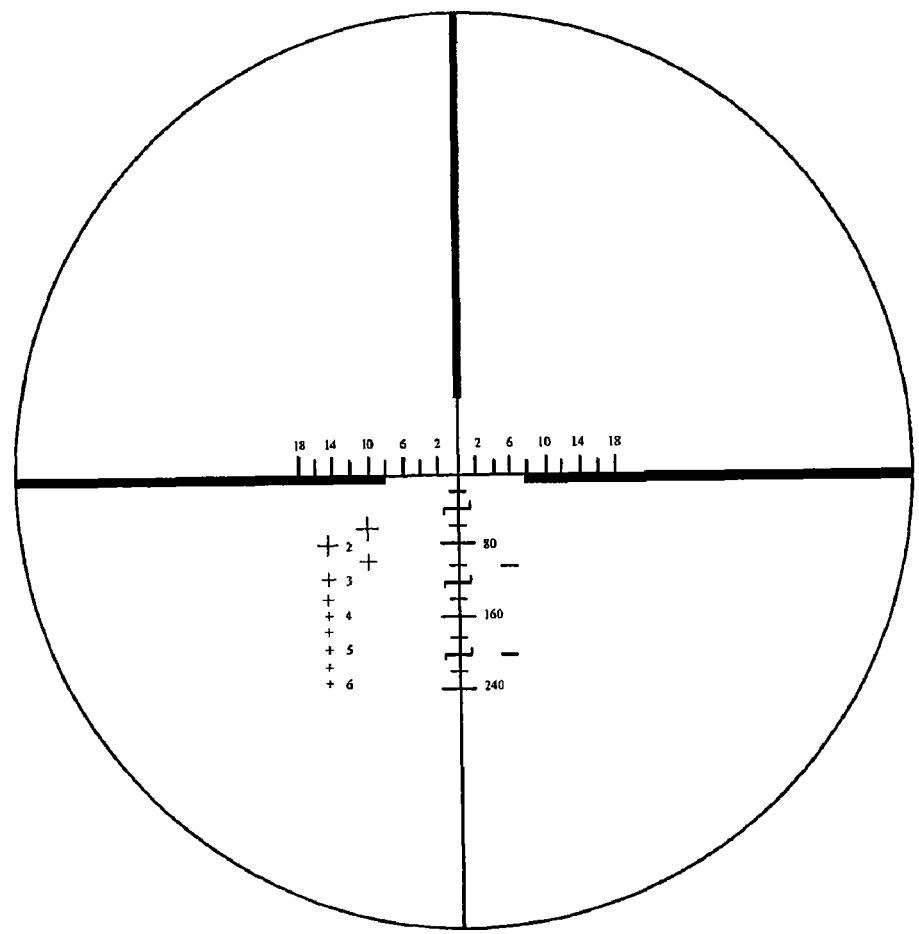
FIG. 5 is a view of a reticle in accordance with one embodiment of the present invention.
Figure 6:
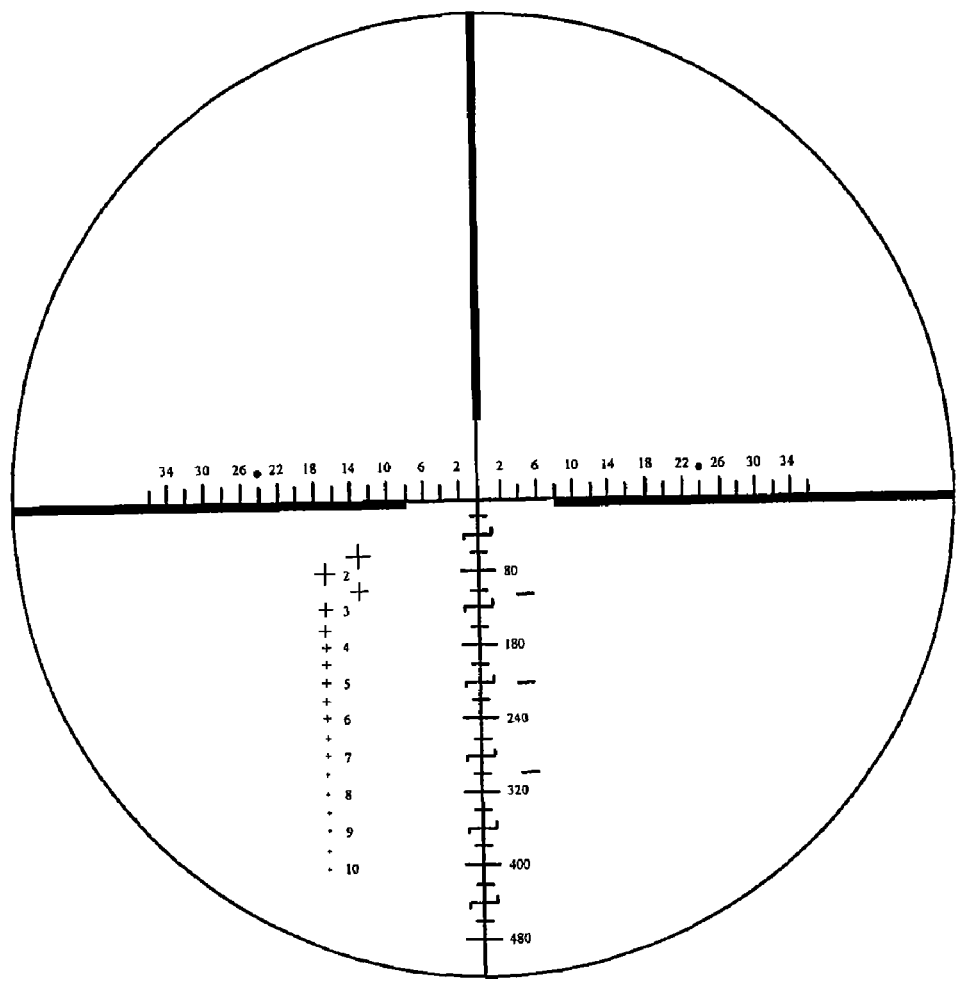
FIG. 6 is a view of a reticle in accordance with one embodiment of the present invention.
Figure 7:
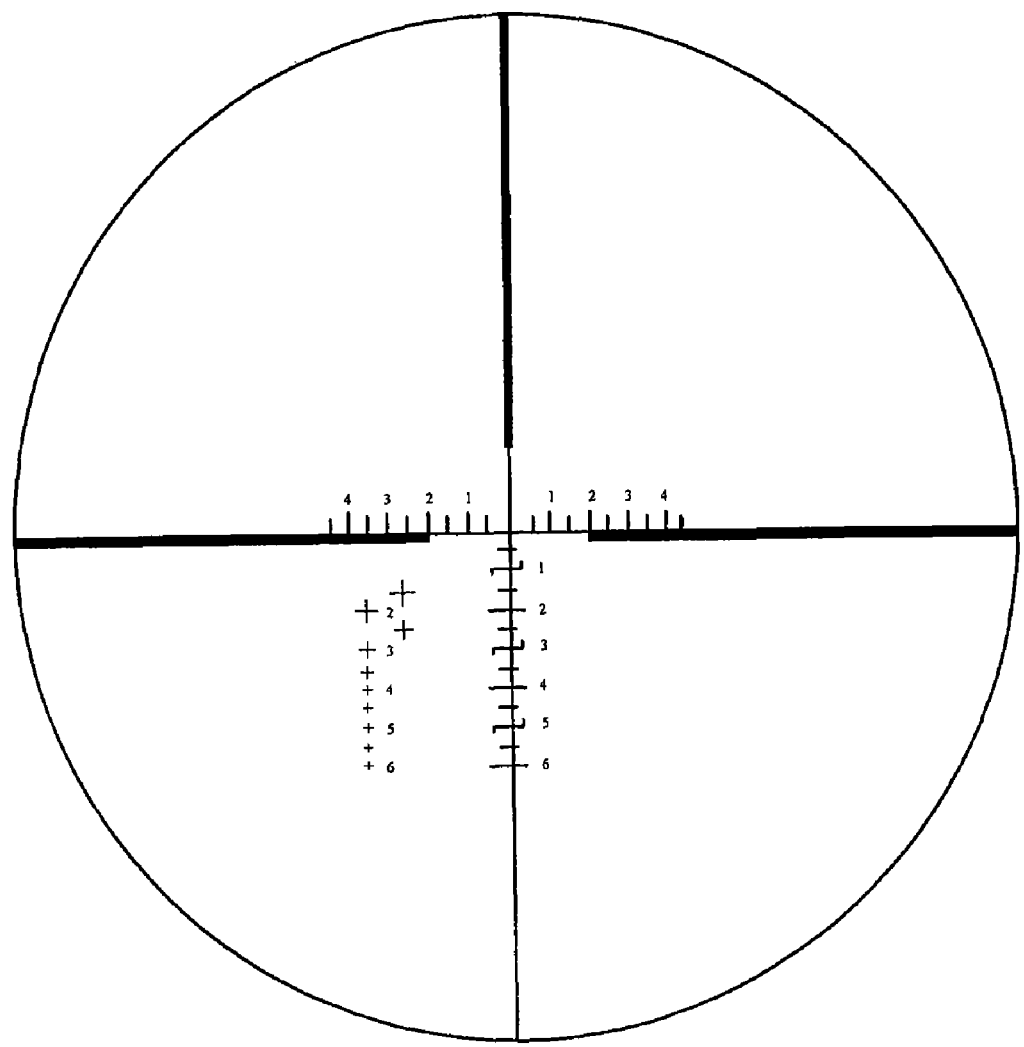
FIG. 7 is a view of a reticle in accordance with one embodiment of the present invention.
Figure 3:
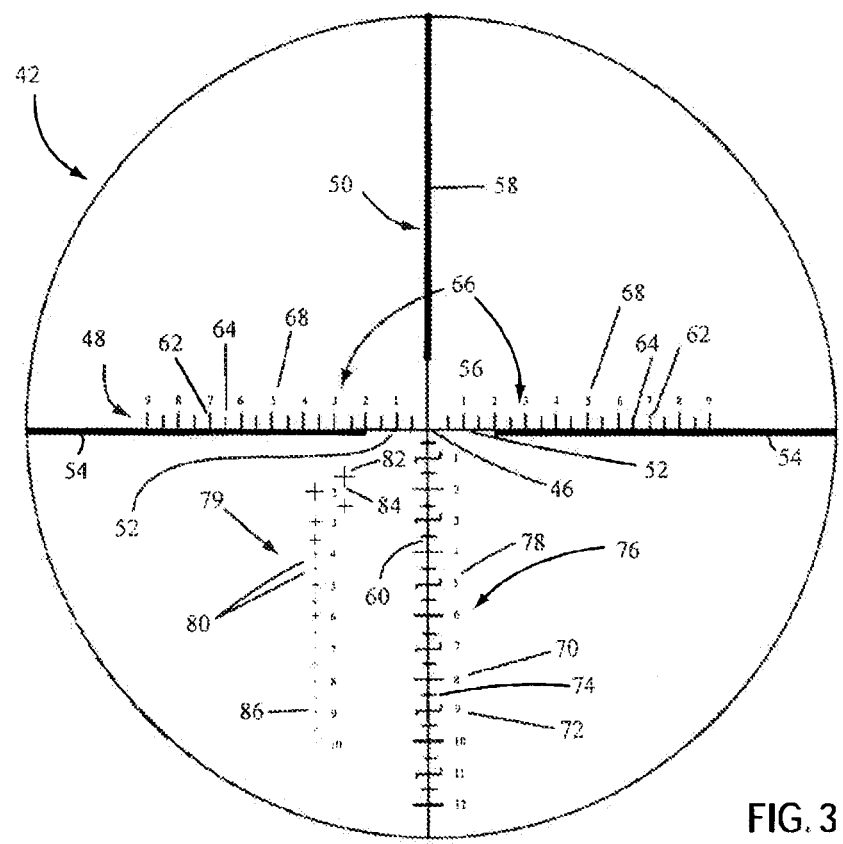
Figure 4:
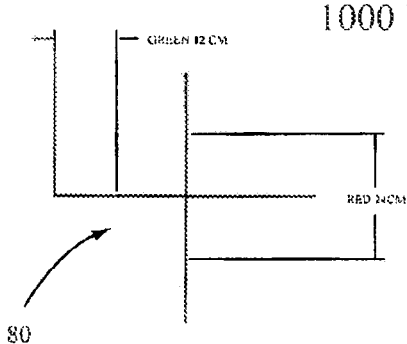
Figure 6:
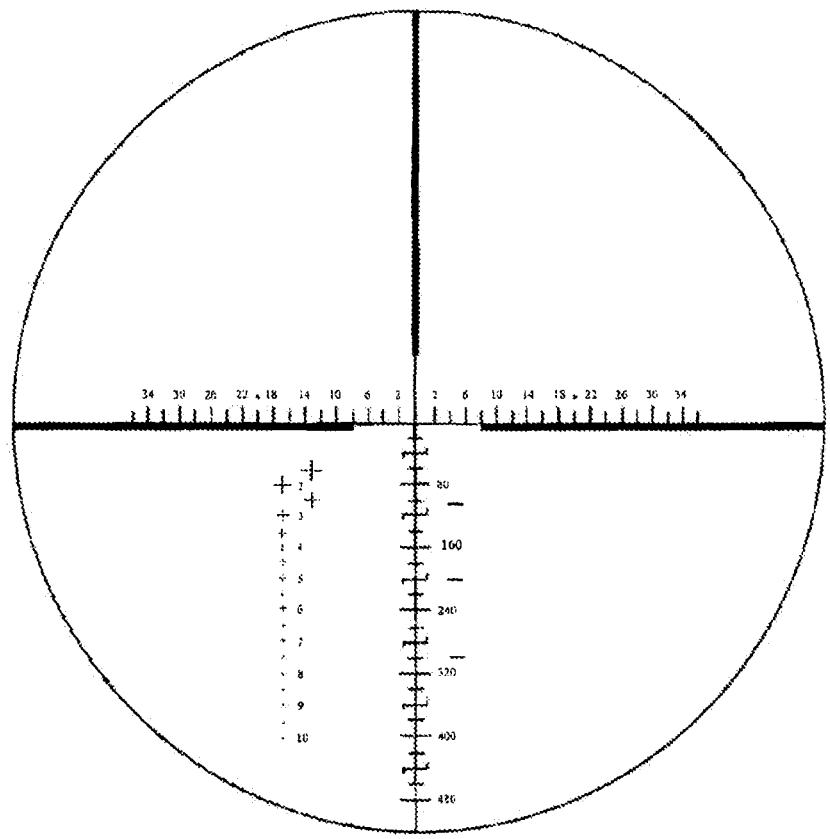

As will be appreciated by those skilled in the art, and as shown in FIGS. 5-7, slight variations may be made to the embodiments of FIGS. 2-3 without deviating from the scope of the present disclosure. For example, FIGS. 5-6 illustrate embodiments of reticles in accordance with the present disclosure having non-metric coordinate systems. As a further example, FIGS. 5-7 illustrate embodiments of reticles in accordance with the present disclosure having alternative maximum ranges. Specifically, FIGS. 5, 6, and 7 comprises embodiments of reticles having maximum ranges of 600 yards, 1000 yards, and 600 meters, respectively. Again, these ranges are intended for illustrative purposes only and reticles in accordance with the present invention may be manufactured having other ranges.

Furthermore, as will be appreciated by those skilled in the art, the embodiments of reticles as previously described, may be used by a shooter to quickly and accurately identify an accurate aiming point for any type of target in any number of conditions.

Although the present invention has been described with reference to preferred embodiments, persons skilled in the art will recognize that changes may be made form and detail without departing from the spirit and scope of the invention.

The invention claimed is:

1. A reticle for a projectile weapon aiming system, said reticle comprising:
   a primary horizontal sight line;
   a primary vertical sight line intersecting the primary horizontal sight line to define a primary aiming point and four quadrants of substantially equal size;
   a windage grid;
   a ballistics grid; and
   a range finder grid;
   wherein the range finder grid comprises a plurality of vertically spaced-apart, vertically aligned crosshairs positioned entirely within a lower-left hand quadrant of the reticle;
   wherein each of the vertically aligned crosshairs defines a substantially identical reading at a predetermined range; and
   wherein an inner half of the vertically aligned crosshairs is provided in a first color and an outer half of the vertically aligned crosshairs is provided in a second color that is different than the first color.

2. The reticle of claim 1, wherein the primary horizontal sight line includes a horizontal central portion extending radially from the primary aiming point, and a horizontal post portion being thicker than the horizontal central portion and extending radially from the horizontal central portion.

3. The reticle of claim 1, wherein the primary vertical sight line includes a vertical lower portion extending radially from the primary aiming point and a vertical upper central portion extending radially from the primary aiming point, and a vertical post portion being thicker than the vertical central portion and extending radially from the vertical upper central portion.

4. The reticle of claim 1, wherein the windage grid comprises a plurality of horizontal aiming marks spaced apart along the primary horizontal sight line.

5. The reticle of claim 4, wherein the horizontal aiming marks comprise primary horizontal aiming marks and secondary horizontal aiming marks.

6. The reticle of claim 5, wherein the primary horizontal aiming marks have a length which is greater than the secondary horizontal aiming marks.

7. The reticle of claim 6, wherein one or more of the primary horizontal aiming marks have an associated unique symbol indicating the relative horizontal distance from the primary aiming point.

8. The reticle of claim 1, wherein the ballistics grid comprises a plurality of vertical aiming marks spaced apart along the primary vertical sight line.

9. The reticle of claim 8, wherein the vertical aiming marks comprise primary, secondary, and tertiary aiming marks.

10. The reticle of claim 9, wherein the primary vertical aiming marks have a length which is greater than the secondary vertical aiming marks and the tertiary vertical aiming marks, and wherein the secondary vertical aiming marks have a length which is greater than the tertiary vertical aiming marks.

11. The reticle of claim 10, wherein the secondary vertical aiming marks comprise a right end portion extending upward in a direction substantially parallel to the primary vertical sight line and a left end portion extending downward in a direction substantially parallel to the primary vertical sight line.

12. The reticle of claim 11, wherein one or more of the primary and secondary vertical aiming marks have an associated unique symbol indicating the relative vertical distance from the primary aiming point.

13. The reticle of claim 1, wherein a plurality of the vertically aligned crosshairs are provided with a unique symbol corresponding to the range of its reading.

14. The reticle of claim 1, wherein moving in a downward direction, the vertically aligned crosshairs correspond to readings that increase in equal increments.

15. The reticle of claim 1, wherein the vertically aligned crosshairs define a 48×48 centimeter reading.

* * * * *

UNITED STATES PATENT AND TRADEMARK OFFICE
CERTIFICATE OF CORRECTION

| | |
|---|---|
| PATENT NO. | : 7,946,073 B1 |
| APPLICATION NO. | : 12/017947 |
| DATED | : May 24, 2011 |
| INVENTOR(S) | : Robert R. Buck |

It is certified that error appears in the above-identified patent and that said Letters Patent is hereby corrected as shown below:

On the Title Page, showing an illustrative figure, should be deleted and substitute therefor the attached title page.

Delete Figure 3-4 and substitute therefor the drawing sheet consisting of Figures 3-4. (See attached replacement sheet)

Delete Figure 6 and substitute therefor the drawing sheet consisting of Figure 6. (See attached replacement sheet)

Signed and Sealed this
Twenty-fifth Day of October, 2011

David J. Kappos
*Director of the United States Patent and Trademark Office*

(12) United States Patent
Buck

(10) Patent No.: US 7,946,073 B1
(45) Date of Patent: May 24, 2011

(54) RETICLE AIMING DEVICE

(76) Inventor: Robert R. Buck, St. Paul, MN (US)

(\*) Notice: Subject to any disclaimer, the term of this patent is extended or adjusted under 35 U.S.C. 154(b) by 678 days.

(21) Appl. No.: 12/017,947

(22) Filed: Jan. 22, 2008

Related U.S. Application Data

(60) Provisional application No. 60/881,666, filed on Jan. 22, 2007.

(51) Int. Cl.
*F41G 1/38* (2006.01)

(52) U.S. Cl. .......................................... 42/130; 42/131

(58) Field of Classification Search ............. 42/130, 42/131
See application file for complete search history.

(56) References Cited

U.S. PATENT DOCUMENTS

| | | | | |
|---|---|---|---|---|
| 6,032,374 A | \* | 3/2000 | Sammut | 42/122 |
| 6,357,158 B1 | \* | 3/2002 | Smith, III | 42/122 |
| 6,453,595 B1 | \* | 9/2002 | Sammut | 42/130 |
| 7,325,353 B2 | \* | 2/2008 | Cole et al. | 42/119 |
| 7,603,804 B2 | \* | 10/2009 | Zaderey et al. | 42/122 |
| 7,685,760 B1 | \* | 3/2010 | Neumaster | 42/129 |
| 2005/0229468 A1 | \* | 10/2005 | Zaderey et al. | 42/122 |
| 2005/0268521 A1 | \* | 12/2005 | Cox et al. | 42/130 |
| 2006/0260171 A1 | \* | 11/2006 | Cole et al. | 42/122 |
| 2007/0137088 A1 | \* | 6/2007 | Peters et al. | 42/111 |

\* cited by examiner

*Primary Examiner* — Bret Hayes
(74) *Attorney, Agent, or Firm* — Dorsey & Whitney LLP; Adam M. Bramwell, Esq.

(57) ABSTRACT

In one embodiment, the reticle for a projectile weapon aiming system comprises a primary horizontal sight line, a primary vertical sight line which intersects the primary horizontal sight line to define a primary aiming point, a windage grid, a ballistics grid, and a range finder grid.

15 Claims, 5 Drawing Sheets

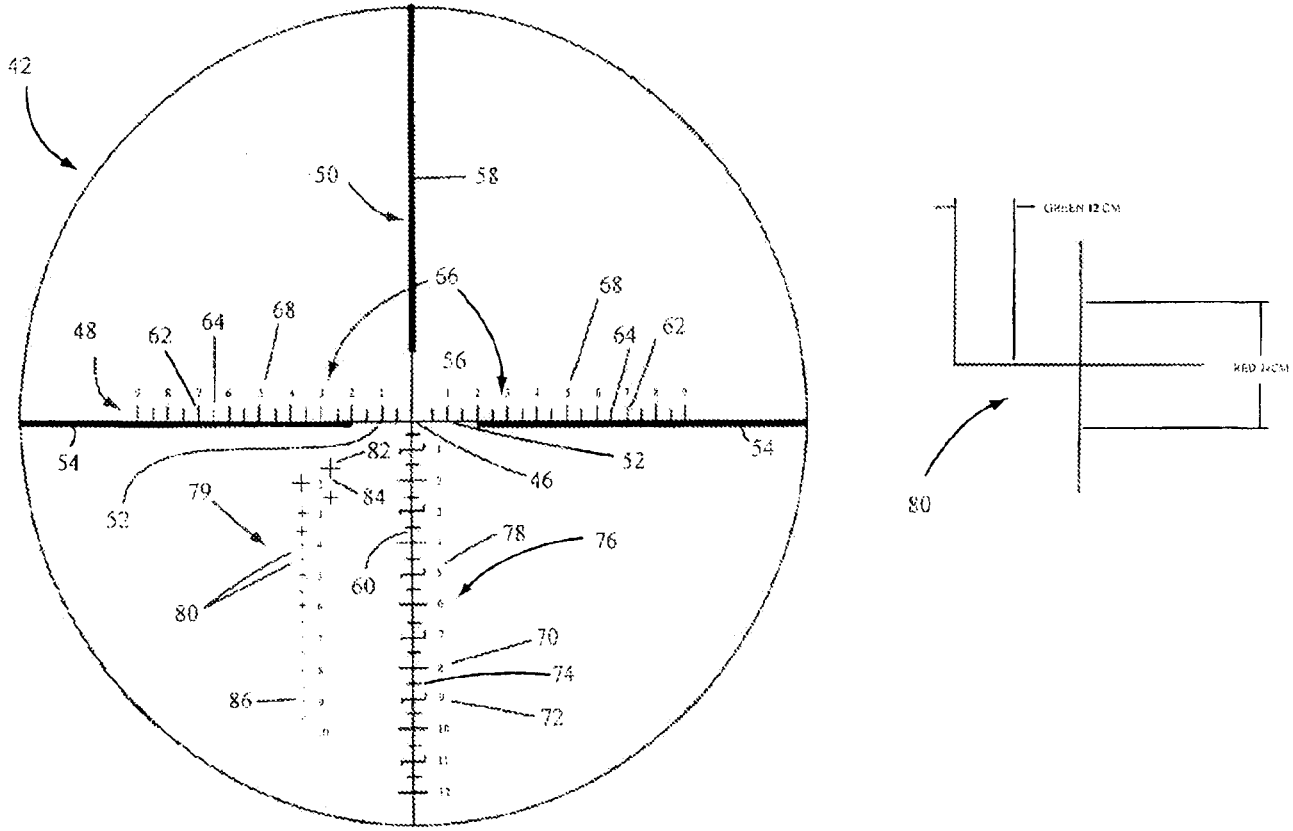

1000 METER SIGHT PICTURE

RANGE FINDER 20"

1000 YD SIGHT PICTURE